United States Patent
Baeg et al.

(10) Patent No.: US 12,496,367 B2
(45) Date of Patent: Dec. 16, 2025

(54) STERILIZER FOR CAR BY USING HOCL AND CONTROL METHOD THEREOF

(71) Applicants: Hyundai Motor Company, Seoul (KR); Kia Corporation, Seoul (KR)

(72) Inventors: Ju-Heon Baeg, Seoul (KR); Ji-Hee Han, Seoul (KR); Ui-Hyun Jeong, Seoul (KR)

(73) Assignees: Hyundai Motor Company, South (KR); Kia Corporation, South (KR)

( * ) Notice: Subject to any disclaimer, the term of this patent is extended or adjusted under 35 U.S.C. 154(b) by 946 days.

(21) Appl. No.: 17/363,592

(22) Filed: Jun. 30, 2021

(65) Prior Publication Data

US 2022/0133932 A1 May 5, 2022

(30) Foreign Application Priority Data

Oct. 30, 2020 (KR) .................. 10-2020-0143013

(51) Int. Cl.
*C02F 1/00* (2023.01)
*A61L 2/22* (2006.01)
*A61L 2/24* (2006.01)
*B60S 1/62* (2006.01)
*C02F 1/461* (2023.01)
(Continued)

(52) U.S. Cl.
CPC .............. *A61L 2/24* (2013.01); *A61L 2/22* (2013.01); *B60S 1/62* (2013.01); *C02F 1/001* (2013.01); *C02F 1/008* (2013.01); *C02F 1/4618* (2013.01); *C25B 1/26* (2013.01); *C25B 9/17* (2021.01); *C25B 15/023* (2021.01); *C25B 15/08* (2013.01); *A61L 2101/06* (2020.08); *A61L 2202/11* (2013.01); *A61L 2202/14* (2013.01); *A61L 2202/15* (2013.01); *A61L 2202/25* (2013.01); *C02F 2001/46185* (2013.01); *C02F 2103/023* (2013.01); *C02F 2201/4612* (2013.01); *C02F 2209/42* (2013.01)

(58) Field of Classification Search
CPC ............................ A61L 2/22; A61L 2202/25
See application file for complete search history.

(56) References Cited

U.S. PATENT DOCUMENTS

2005/0239746 A1* 10/2005 Penkler .............. A61K 47/6951
  514/731
2019/0167829 A1* 6/2019 Grinstead ............... A61L 2/085

FOREIGN PATENT DOCUMENTS

CA    3079166 A1 *  4/2019 ............. A01N 25/02
CN  101570928 A  * 11/2009 ............. D06F 58/46
(Continued)

OTHER PUBLICATIONS

CN_107865974_A_Translation (Year: 2018).*
(Continued)

*Primary Examiner* — Elizabeth A Robinson
*Assistant Examiner* — Changru Chen
(74) *Attorney, Agent, or Firm* — Slater Matsil, LLP

(57) ABSTRACT

A sterilizer for a vehicle includes a controller, a supply water storage configured to accommodate water required for generating hypochlorous acid water (HOCL) under control of the controller, an HOCL generator configured to generate HOCL by using water accommodated in the supply water storage under the control of the controller, and a sprayer configured to inject the HOCL generated in the HOCL generator to the vehicle under the control of the controller.

20 Claims, 9 Drawing Sheets

(51) Int. Cl.
  *C25B 1/26*  (2006.01)
  *C25B 9/17*  (2021.01)
  *C25B 15/023*  (2021.01)
  *C25B 15/08*  (2006.01)
  *A61L 101/06*  (2006.01)
  *C02F 103/02*  (2006.01)

(56) References Cited

FOREIGN PATENT DOCUMENTS

| | | | |
|---|---|---|---|
| CN | 107865974 A | * | 4/2018 |
| CN | 111359801 A | * | 7/2020 |
| JP | 2007312988 A | * | 12/2007 |
| JP | 2020137618 A | * | 9/2020 |
| KR | 100706118 B1 | * | 4/2007 |
| KR | 20120003997 A | * | 1/2012 |
| KR | 20200027856 A | | 3/2020 |
| WO | WO-2019116596 A1 | * | 6/2019 |

OTHER PUBLICATIONS

CN_111359801_A_Translation (Year: 2020).*
JP_2007312988_A_Translation (Year: 2007).*
JP_2020137618_A_Translation (Year: 2020).*
KR_100706118_B1_Translation (Year: 2007).*
WO_2019116596_A1 Translation (Year: 2019).*
KR_20120003997_A_Translation (Year: 2012).*
CN_101570928_A_translation (Year: 2009).*

* cited by examiner

STERILIZER FOR CAR BY USING HOCL AND CONTROL METHOD THEREOF

CROSS-REFERENCE TO RELATED APPLICATIONS

This application claims the benefit of Korean Patent Application No. 10-2020-0143013, filed in the Korean Intellectual Property Office on Oct. 30, 2020, which application is hereby incorporated herein by reference.

TECHNICAL FIELD

The present invention relates to a vehicle sterilizer installed in a vehicle.

BACKGROUND

In general, hypochlorous acid water (HOCL) has sterilizing power when hypochlorous acid water has an effective chlorine concentration of 0.2 to 4 ppm and a pH of 3 to 8, and it is known that the HOCL effectively sterilizes colon bacillus, staphylococcus, salmonella pathogen, cholera pathogen, fungal fungus, yeast fungus, influenza virus, HIV virus, norovirus, candida filamentous fungus, athlete's foot fungus, cereus spore, and botulinum spore.

Since tap water supplied to homes contains approximately 10 to 30 ppm of effective chlorine concentration, it is possible to generate HOCL through electrolysis of tap water.

That is, when tap water is electrolyzed, oxygen and hydrogen forming water molecules become an ion state and combine with chlorine contained in the tap water to generate HOCL having sterilizing power of an effective chlorine concentration of approximately 1 to 2 ppm and a hydrogen ion concentration (pH) of 6.0 to 7.0.

The sterilizing power of HOCL has been approved by each country as a food additive (November, 2007) and a sterilizing agent of furniture and the like (August, 2008) by the Korean Food and Drug Administration (KFDA), as a disinfectant producing device of an HOCL generating apparatus by the European Productive Agency (EPA) (1998), as Generally Recognized As Safe (GRAS) and fruit and vegetable washing water (2000) by the Food and Drug Administration (FDA) of the USA, and as food disinfectant (June, 2002) by the Ministry of Health, Labor, and Welfare of Japan.

Sterilization of bacteria and viruses in the interior of the vehicle is required with the development of the automobile industry and the growth of the hygiene-related industry, so that the development of a vehicle sterilization device which is harmless to the human body and has strong sterilizing power is required.

SUMMARY

The present invention relates to a vehicle sterilizer installed in a vehicle. Particular embodiments relate to a sterilizer for a vehicle, which includes a control unit, a supply water storage unit for accommodating water required for generating hypochlorous acid water under control of the control unit, a hypochlorous acid water generating unit for generating hypochlorous acid water by using water accommodated in the supply water storage unit under the control of the control unit, and a spray unit for injecting the hypochlorous acid water generated in the hypochlorous acid water generating unit to a vehicle under the control of the control unit.

Embodiments of the present invention have been made in an effort to solve problems, and provide a sterilizer for a vehicle, which injects hypochlorous acid water (HOCL) which is harmless to the human body and has strong sterilizing power to a vehicle to automatically and continuously sterilize the vehicle, and a control method thereof.

An exemplary embodiment of the present invention provides a sterilizer for a vehicle using hypochlorous acid water including a control unit, a supply water storage unit for accommodating water required for generating hypochlorous acid water under control of the control unit, a hypochlorous acid water generating unit for generating hypochlorous acid water by using water accommodated in the supply water storage unit under the control of the control unit, and a spray unit for injecting the hypochlorous acid water generated in the hypochlorous acid water generating unit to a vehicle under the control of the control unit, and a control method thereof.

The sterilizer for the vehicle using the hypochlorous acid water of embodiments of the present invention including the foregoing configuration and the control method thereof exhibit the following effects.

First, embodiments of the present invention provide the sterilizer which is capable of providing hypochlorous acid water to a vehicle itself, thereby keeping a sanitary state inside the vehicle clean.

Second, the sterilizer of embodiments of the present invention is linked with a portable terminal of a user, thereby improving the user's convenience and enabling the user to easily manipulate the sterilizer.

Third, water generated in and discharged from a vehicle may be recycled as water for sterilization through the sterilizer of embodiments of the present invention.

Fourth, the sterilizer of embodiments of the present invention links an information providing unit with air-conditioning equipment of a vehicle, thereby adjusting a temperature and humidity inside the vehicle.

BRIEF DESCRIPTION OF THE DRAWINGS

FIGS. 6 and 7 are flowcharts for controlling the sterilizer for the vehicle of embodiments of the present invention, in which FIG. 6 is a flowchart when the sterilizer is not operated, and FIG. 7 is a flowchart when the sterilizer is operated.

DETAILED DESCRIPTION OF ILLUSTRATIVE EMBODIMENTS

Hereinafter, a configuration and an operation of a sterilizer for a vehicle using hypochlorous acid water of embodiments of the present invention and a control method thereof will be described in detail with reference to the accompanying drawings.

However, the disclosed drawings are provided as an example for fully delivering the spirit of the present invention to those skilled in the art. Accordingly, the present invention is not limited to the drawings presented below, and may also be specified in other aspects.

Unless otherwise defined, the terms used in the specification of the present invention have the meanings commonly understood by those skilled in the art, and the detailed descriptions of well-known functions and configurations may be omitted in the description below and the accompanying drawings to avoid obscuring the subject matter of the present invention.

Figure 1:
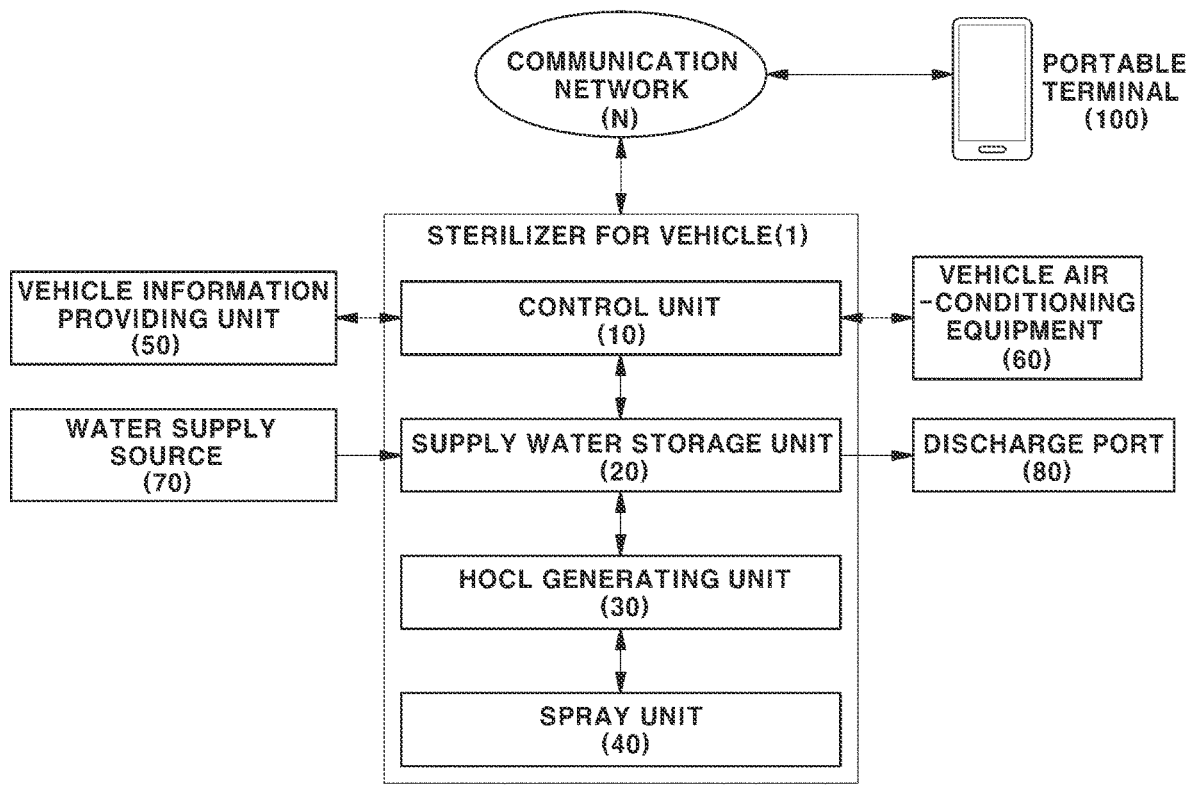
FIG. 1 is a diagram illustrating a sterilizer for a vehicle of embodiments of the present invention.

FIG. 1 is a diagram illustrating a sterilizer for a vehicle of embodiments of the present invention.

The sterilizer 1 for the vehicle of embodiments of the present invention is an apparatus which is capable of automatically and continuously sterilizing a vehicle by injecting hypochlorous acid water (HOCL) which is harmless to the human body and has strong sterilizing power to the vehicle.

Referring to the drawing, the sterilizer 1 for the vehicle (hereinafter, simply referred to as "the sterilizer") of embodiments of the present invention includes a control unit 10, a supply water storage unit 20 for accommodating water required for generating HOCL under control of the control unit 10, an HOCL generating unit 30 for generating HOCL by using water accommodated in the supply water storage unit 20 under the control of the control unit 10, and a spray unit 40 for injecting the HOCL generated in the HOCL generating unit 30 to the inside or the outside of a vehicle under the control of the control unit 10.

The sterilizer 1 of embodiments of the present invention is linked with a vehicle information providing unit 50 and vehicle air-conditioning equipment 60, and sprays HOCL according to vehicle internal state information provided from the vehicle information providing unit 50 and then dries the interior of the vehicle by the vehicle air-conditioning equipment 60.

The sterilizer 1 of embodiments of the present invention includes a water supply source 70 for supplying water to the supply water storage unit 20, and a discharge port 80 for discharging water to the outside of the vehicle in the case where it is necessary to discharge water to the outside of the vehicle according to the state of the water supplied to the supply water storage unit 20.

The sterilizer 1 of embodiments of the present invention communicates with a portable terminal 100 of the user through a communication network N.

The supply water storage unit 20 accommodates water required for generating HOCL sprayed to the vehicle by the sterilizer 1 of embodiments of the present invention.

The supply water storage unit 20 measures a water level of the accommodated water by a supply water measuring sensor 22 (see FIG. 2), and whether to discharge water to the HOCL generating unit 30 is controlled by the control unit 10, so that the supply water storage unit 20 maintains an optimum storage amount.

The HOCL generating unit 30 generates HOCL by using the water supplied from the supply water storage unit 20.

The HOCL generating unit 30 generates HOCL through electrolysis of water, and adjusts an optimum concentration and pH so that the HOCL has sterilizing power in the producing process of HOCL by the control unit 10.

The spray unit 40 sprays the HOCL generated from the HOCL generating unit 30 to the vehicle. A place to which the HOCL is sprayed is the interior space or the outside of the vehicle, but it is preferable to mainly spray the HOCL to the interior space of the vehicle occupied by passengers of the vehicle.

The control unit 10 controls the supply water storage unit 20, the HOCL generating unit 30, and the spray unit 40 of the sterilizer 1 of embodiments of the present invention.

The control unit 10 communicates with the portable terminal 100 of the user through the communication network N, and receives command data for operating the sterilizer 1 from an application program for operating the sterilizer 1 executed in the portable terminal 100 of the user.

When the sterilizer 1 is operated, the control unit 10 provides the portable terminal 100 of the user with a sterilization progress state, information about the inside of the vehicle related to sterilization, and the like through the communication network N.

The vehicle information providing unit 50 receives sensor signals generated from a vehicle sensor (not shown), such as a temperature sensor, a humidity sensor, a door-lock detecting sensor, and a passenger detecting sensor for sensing whether a passenger is seated on a front seat or a rear seat, generates vehicle information, such as an interior temperature of the vehicle, an outside temperature of the outside of the vehicle, inside humidity of the vehicle, outside humidity of the outside of the vehicle, a locking state of the door lock (a lock state or unlock state of the door), and whether a passenger is seated on the front seat or the rear seat of the vehicle, and transmits the generated vehicle information to the control unit 10.

The vehicle air-conditioning equipment 60 refers to the general vehicle air-conditioning equipment, such as an air conditioner for cooling the vehicle and a heater for heating the vehicle.

The portable terminal 100 of the user is the terminal which is capable of transceiving data with the sterilizer 1 of embodiments of the present invention through the communication network N, and generally refers to a portable terminal, a smart phone, a tablet computer, a notebook computer, a Personal Digital Assistant (PDA), and a Personal Computer (PC), and preferably includes a smart phone capable of installing and executing an application program through the communication network N.

In the meantime, the communication network N is a publicly known wired or wireless communication network for establishing the communication between the sterilizer 1 of embodiments of the present invention and the portable terminal 100 of the user, and is preferably Bluetooth or wireless Internet.

Hereinafter, the constituent elements of the sterilizer 1 for the vehicle of embodiments of the present invention including the above configuration will be described in more detail with reference to the drawings.

Figure 2:
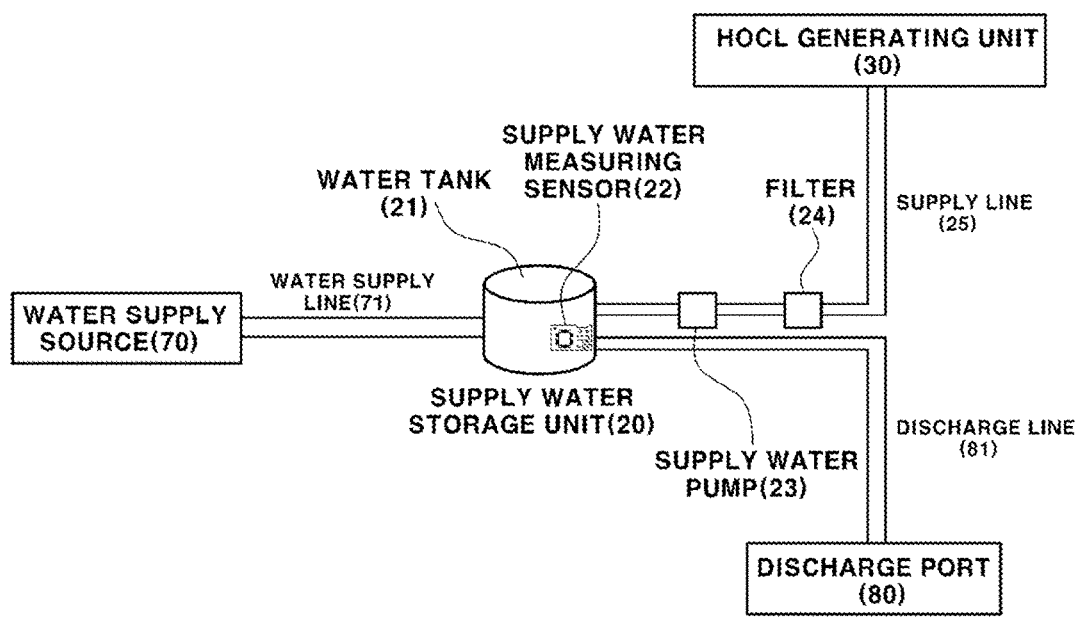
FIG. 2 is a diagram illustrating a supply water storage unit of the sterilizer for the vehicle of embodiments of the present invention.
Figure 3:
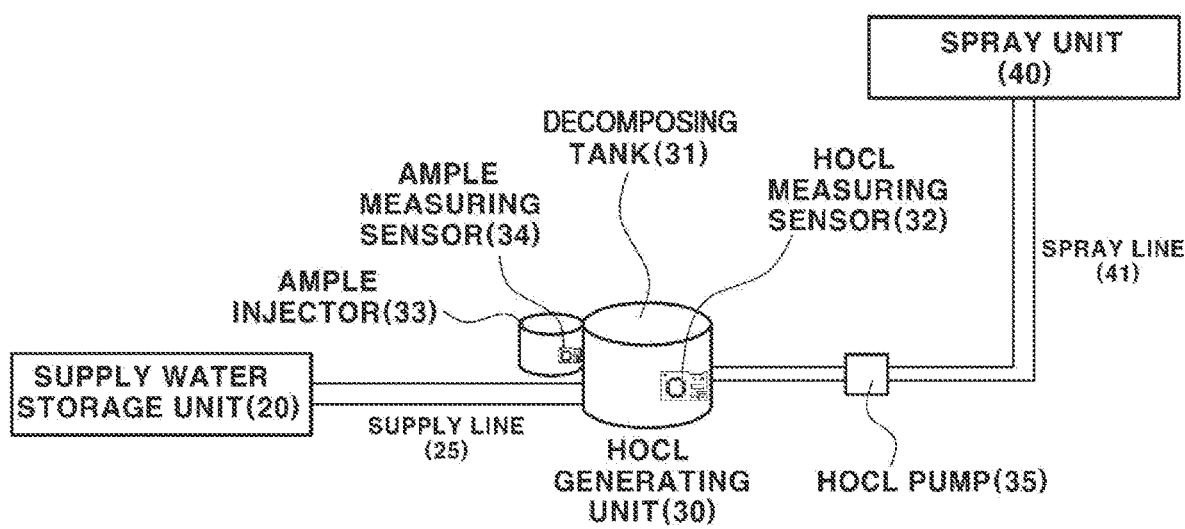
FIG. 3 is a diagram illustrating a hypochlorous acid water generating unit of the sterilizer for the vehicle of embodiments of the present invention.
Figure 4:
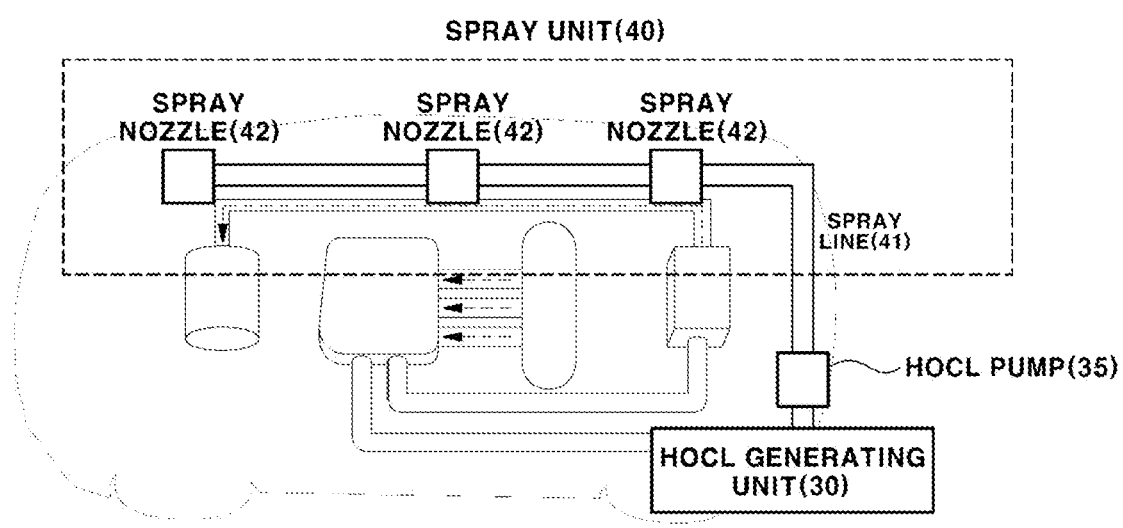
FIG. 4 is a configuration diagram illustrating a spray unit of the sterilizer for the vehicle of embodiments of the present invention.

FIG. 2 is a diagram illustrating the supply water storage unit of the sterilizer for the vehicle of embodiments of the present invention, FIG. 3 is a diagram illustrating the HOCL generating unit of the sterilizer for the vehicle of embodiments of the present invention, and FIG. 4 is a configuration diagram illustrating the spray unit of the sterilizer for the vehicle of embodiments of the present invention.

First, referring to FIG. 2, the supply water storage unit 20 of embodiments of the present invention accommodates water required for generating HOCL performing sterilization.

The supply water storage unit 20 includes a water tank 21 for accommodating water, a supply water measuring sensor 22 for measuring a state of the water accommodated in the water tank 21, a pump 23 for supplying the water accommodated in the water tank 21 to the HOCL generating unit 30, and a filter 24 for removing foreign substances or impurities included in the water accommodated in the water tank 21.

A water supply line 71, which receives water from a water supply source 70, a discharge line 81, through which the water accommodated in the water tank 21 is forcibly discharged to the outside of the vehicle via the discharge port 80, and a supply line 25, through which the water accommodated in the water tank 21 flows to the HOCL generating unit 30, are connected to the water tank 21 of the supply water storage unit 20.

The water supply source 70 is a part for supplying water to the supply water storage unit 20, and the water supply source 70 in an exemplary embodiment of the present invention may be one of a water trap, a drain hose, and a water inlet installed in the vehicle.

The water trap is a storage which is mounted inside a hydrogen electric vehicle and temporarily stores water that is a by-product generated in a stack of a fuel cell, and the drain hose is a hose through which water generated during cooling operation of the vehicle air-conditioning equipment 60 is discharged.

The water inlet is a separate container installed in a vehicle so as to directly receive water required in the sterilizer of embodiments of the present invention by a user of the vehicle.

The supply water measuring sensor 22 includes a water level measuring sensor for measuring a level of the water accommodated in the water tank 21. Accordingly, when it is necessary to forcibly discharge the water to the outside of the vehicle according to the level of the received water in the water tank 21, the control unit 10 opens the discharge line 81 of the water tank 21 and discharges the water through the discharge port 80 formed at a distal end of the discharge line 81.

The supply water measuring sensor 22 may be the sensor for monitoring an abnormal state of the supply water storage unit 20, and the control unit 10 may block the supply of the water through the supply line 25 when an abnormal situation of the supply water storage unit 20 occurs.

Next, referring to FIG. 3, the HOCL generating unit 30 of embodiments of the present invention receives water through the supply line 25 from the supply water storage unit 20 and generates HOCL having sterilizing power.

To this end, the HOCL generating unit 30 includes a decomposing tank 31 which accommodates the water supplied from the supply water storage unit 20 and electrolyzes the accommodated water to generate HOCL, a HOCL measuring sensor 32 which measures a state of the water accommodated in the decomposing tank 31 and a state of the generated HOCL, an ample injector 33 which accommodates ample for changing the water accommodated in the decomposing tank 31 to water having an effective chlorine concentration and hydrogen ion concentration suitable for sterilization and injects the ample, and an HOCL pump 35 which transfers the HOCL generated in the decomposing tank 31 to the spray unit 40.

The decomposing tank 31 is connected with a spray line 41 which transfers the generated HOCL to the spray unit 40 and a supply line 25 which receives water from the supply water storage unit 20.

The HOCL generating unit 30 includes the HOCL measuring sensor 32 for measuring a state of the HOCL accommodated in the decomposing tank 31, and preferably, the HOCL measuring sensor 32 is a water level measuring sensor for measuring a level of the HOCL accommodated in the decomposing tank 31 and a concentration measuring sensor for measuring a concentration of the HOCL The water level measuring sensor as the HOCL measuring sensor 32 measures a water level for determining whether the water supplied from the supply water storage unit 20 satisfies the appropriate amount required for generating HOCL, and the concentration measuring sensor as the HOCL measuring sensor 32 is the sensor for measuring an effective chlorine concentration and a hydrogen ion concentration (pH) of the HOCL for determining whether the concentration of the generated HOCL is suitable for sterilization.

The ample injector 33 accommodates ample for changing the water accommodated in the decomposing tank 31 to water having an effective chlorine concentration and a hydrogen ion concentration suitable for sterilization, and injects the ample to the decomposing tank 31 of the HOCL generating unit 30.

In general, an effective chlorine concentration of the HOCL suitable for sterilization is 20 to 70 ppm, and a hydrogen ion concentration suitable for sterilization is 5.0 to 6.5 pH, and the ample injector injects the fixed amount of ample for establishing the effective chlorine concentration and the hydrogen ion concentration of the HOCL suitable for sterilization to the decomposing tank 31 before electrolysis after receiving the fixed amount of water.

In this case, it is preferable to design the ample injector 33 such that when the ample accommodated in the ample injector 33 is exhausted, a user directly supplements the ample in the ample injector 33.

The ample injector 33 may include an ample measuring sensor 34 which measures a state of the ample accommodated in the ample injector 33.

Preferably, the ample measuring sensor 34 is an ample level measuring sensor for measuring a level of the ample accommodated in the ample injector 33, and is intended to allow a user to recognize the remaining amount of the ample.

Referring to FIG. 4, the spray unit 40 of embodiments of the present invention includes the spray line 41 which receives the HOCL from the HOCL generating unit 30, and one or more spray nozzles 42 installed in the spray line 41 to spray the HOCL to the inside or the outside of the vehicle.

In this case, the interior space of the vehicle in which the spray nozzle 42 is installed may include a peripheral portion of the driver's seat and the auxiliary seat forming the front seat inside the vehicle, a peripheral portion of the rear seat inside the vehicle, a steering wheel, a gear stick, a dash board, an air-conditioner operation part, an AVN operation part of an audio player or a navigation device, an inside of a trunk, and the like.

The outside space of the vehicle in which the spray nozzle 42 is installed may include a trunk handle, a handle of a front door or rear door, and the like.

In this case, it is possible to adjust spray pressure of the HOCL injected from the spray nozzle 42 by adjusting the pumping amount of the HOCL pump 35 which is installed in the spray line 41 and transfers the HOCL generated in the decomposing tank 31 to the spray unit 40.

The installation locations, the number, and the spray amount of the spray lines 41 and the spray nozzles 42 may be changed according to the kind of vehicle, an interior design of the vehicle, and interior materials in the vehicle interior.

The spray nozzle 42 may use various types of nozzles, such as pressure type or ultrasonic type capable of spraying in the form of fine particles for efficient spraying up to the blind spot, and may adopt a rotation-type nozzle in which the spray nozzle 42 itself rotates, or a movable nozzle in which the spray nozzle 42 itself moves.

Next, an example of an execution screen of an application program executed in a user portable terminal for operating the sterilizer for the vehicle of the present invention will be described with reference to FIGS. 5A-5D.

Referring to FIGS. 5A-5D, the sterilizer for the vehicle of embodiments of the present invention may be controlled through an application program for remotely controlling a vehicle, which is provided by a manufacturing company of the vehicle and installed and executed in the portable terminal 100 of the user, or a control exclusive application program of the sterilizer for the vehicle of embodiments of the present invention.

Figure 5A:
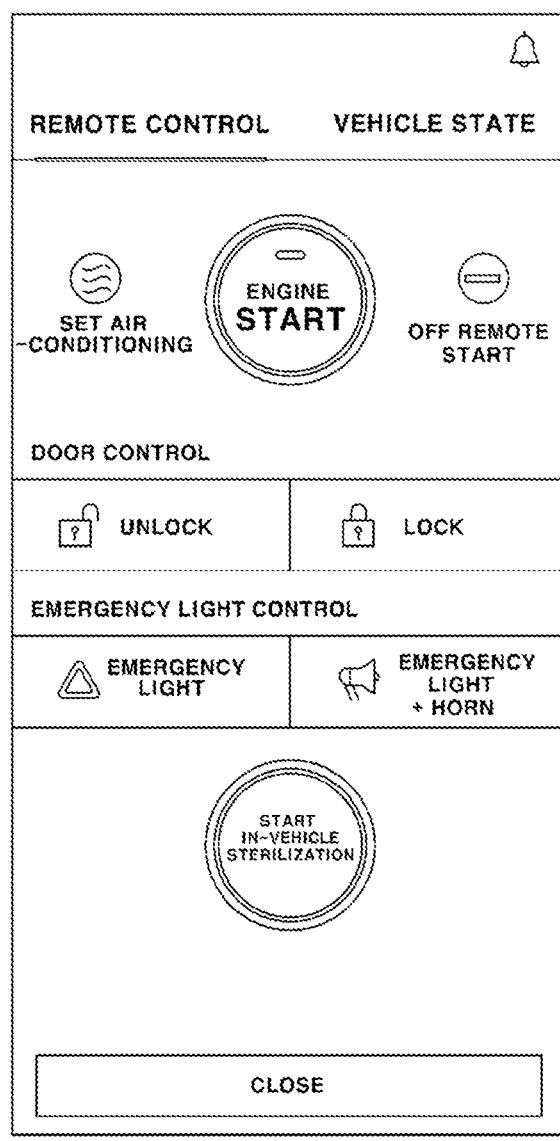
FIGS. 5A-5D are diagrams illustrating examples of an execution screen of an application program executed in a user portable terminal for operating the sterilizer for the vehicle of embodiments of the present invention.
Figure 5B:
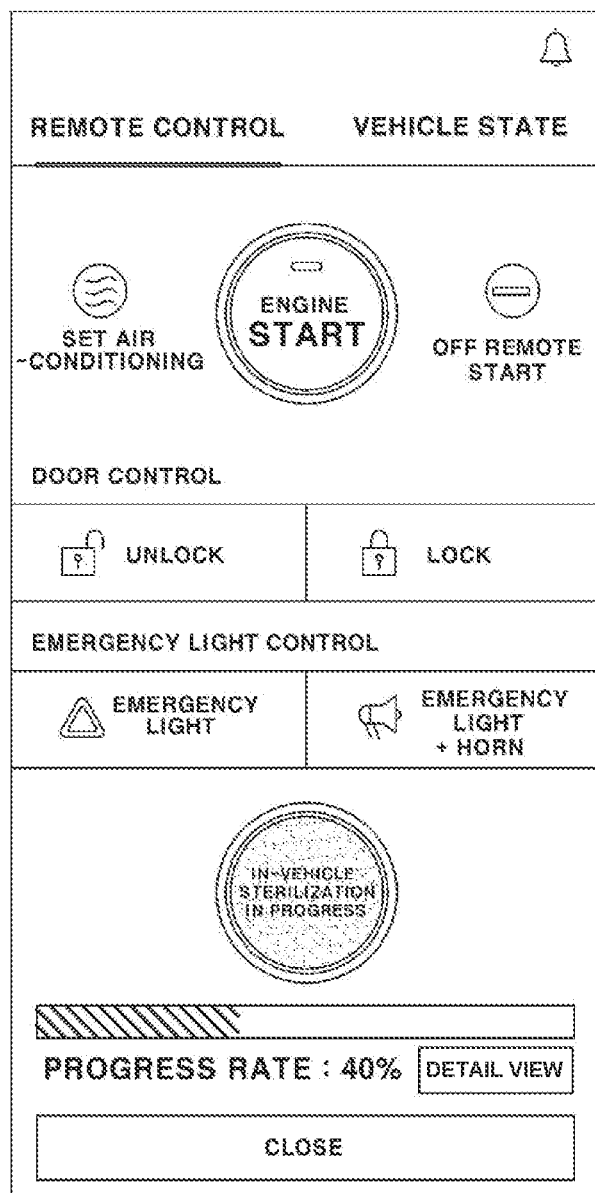

To describe the application program of the sterilizer for the vehicle of embodiments of the present invention in detail, when the user selects a menu item of "vehicle interior sterilization start" in a performance screen of the application program displayed on a display screen of the portable terminal 100 like the execution screen illustrated in FIG. 5A, command data of the vehicle interior sterilization start is transferred to the control unit 10 of the sterilizer for the vehicle, the control unit 10 receiving the command data activates each of the supply water storage unit 20, the HOCL generating unit 30, and the spray unit 40 like the execution screen illustrated in FIG. 5B, to spray the HOCL to the inside or the outside of the vehicle, and a progress rate of the sterilization is displayed in real time through the execution screen of the application program.

Figure 5C:
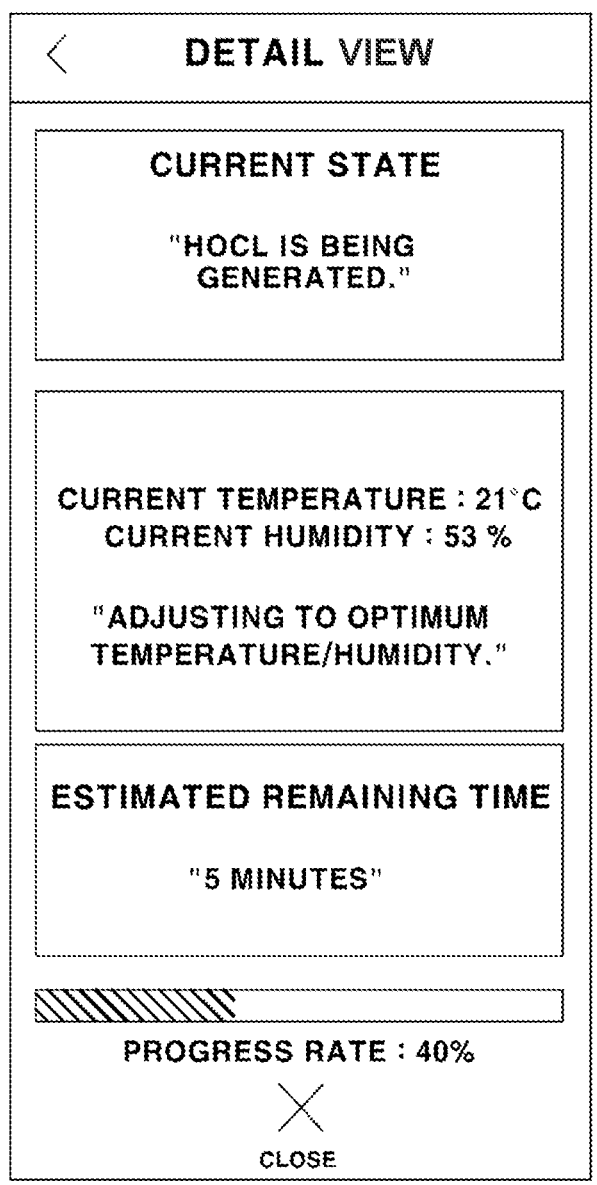

When the user selects the "Detail View" of the progress state of "Vehicle Sterilization in Progress" illustrated in FIG. 5B, detailed information, such as a temperature state and a humidity state inside the vehicle, estimated remaining time until sterilization is completed, and the like is displayed on the execution screen of the application program as illustrated in FIG. 5C.

Figure 5D:
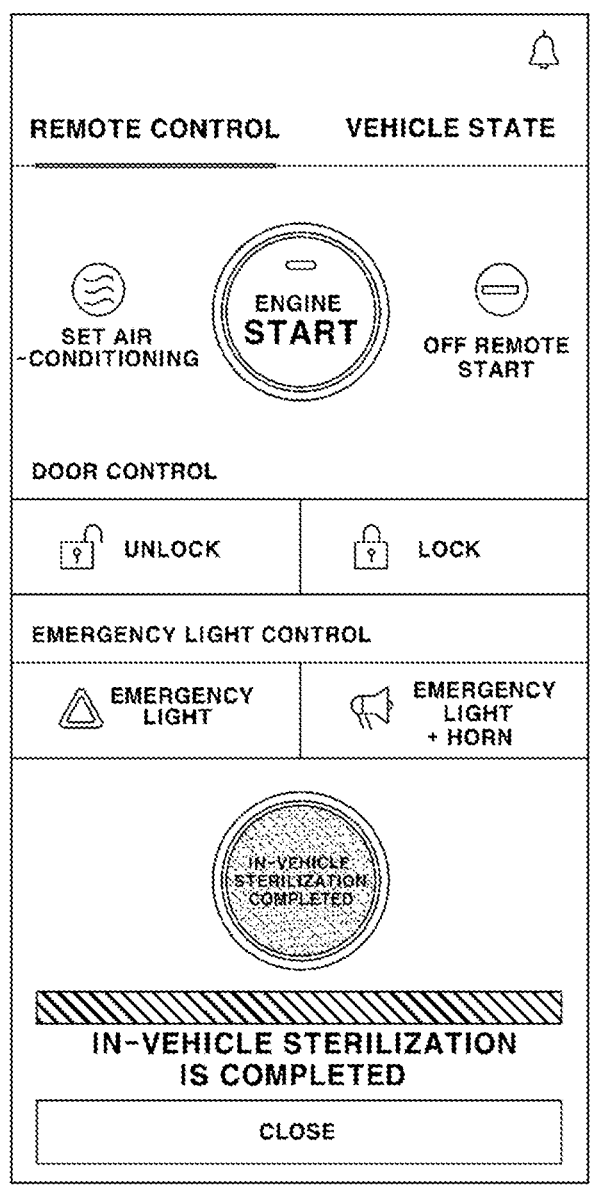

Then, when the sterilization of the vehicle is completed, the application program displays that the sterilization of the vehicle is completed on the execution screen of the application program, as illustrated in FIG. 5D, and additionally, the application program may display vehicle information, such as an inside temperature of the vehicle, an outside temperature of the vehicle, internal humidity of the vehicle, outside humidity of the vehicle, a locking state of a door lock (a locking state or an unlocking state of the door), and whether a passenger is present on a front seat or a rear seat of the vehicle according to sensor signals received from the temperature sensor, the humidity sensor, the door-lock detecting sensor, and a passenger detecting sensor configuring the vehicle sensor, and furthermore, may also display information on whether the supply water storage unit 20, the HOCL generating unit 30, and the spray unit 40 are malfunctioning, recording information on an operation date of the sterilization operation, and information on whether the vehicle can be sterilized in the current state.

In the meantime, as the communication means for data transception between the control unit 10 of the sterilizer 1 for the vehicle of embodiments of the present invention and the portable terminal 100 of the user, various communication means, such as Bluetooth or wireless Internet, may be used.

Next, the method of setting the amount of HOCL to be sprayed to the vehicle by the control unit 10 of the sterilizer 1 for the vehicle of embodiments of the present invention will be described.

According to an exemplary embodiment of the present invention, the control unit 10 of embodiments of the present invention may set the amount of HOCO to be sprayed as represented in Equation 1 blow according to the volume of vehicle.

$$L_{HOCL} = \text{floor}(V_{vehicle} \times 10 + 0.5) \times M(ml/m^3) \quad \text{[Equation 1]}$$

*Note $L_{HOCL}$: Amount of HOCL to be sprayed (ml)

$V_{vehicle}$: Internal volume of vehicle (m³)

M: Amount of HOCL to be sprayed per unit volume (ml/m³)

floor( ): Decimal point rounding

For example, in the case where it is set that the volume of the vehicle is 2,942 m³, 100 ml of HOCL is sprayed per 1 m³, and a unit interval of the amount of sprayed HOCL is 10 ml, the amount of HOCL to be sprayed according to Equation 1 is set to 290 ml.

According to an exemplary embodiment of the present invention, the control unit 10 of embodiments of the present invention may set a minimum dry time of the vehicle air-conditioning equipment 50 as represented in Equation 2 below according to the amount of sprayed HOCL calculated in Equation 1.

$$T_{dry} = L_{HOCL} \times 0.01 \times T \quad \text{[Equation 2]}$$

*Note $T_{dry}$: Minimum dry time $L_{HOCL}$: Amount of HOCL to be sprayed (ml)

T: Minimum dry time per 100 ml

For example, when the dry of a minimum of 90 seconds is performed per 100 ml of $L_{HOCL}$ and a unit interval of the minimum dry time ($T_{dry}$) is 1 second, the minimum dry time ($T_{dry}$) may be calculated as $T_{dry} = L_{HOCL} \times 0.01 \times 90$ (sec).

The Table 1 below represents an example of calculating $L_{HOCL}$ (the amount of sprayed HOCL) and the minimum dry time ($T^{dry}$) according to the interior volume of the vehicle according to Equations 1 and 2.

TABLE 1

| $V_{vehicle}$ (interior volume of vehicle (m³)) | $L^{HOCL}$ (amount of HOCL to be sprayed (ml)) | $T_{dry}$: Minimum dry time (sec) |
| --- | --- | --- |
| 2.942 | 290 | 261 |
| 3.120 | 310 | 279 |
| 3.162 | 320 | 288 |
| 3.409 | 340 | 306 |
| 3.706 | 370 | 333 |
| 4.151 | 420 | 378 |
| 4.907 | 490 | 441 |

In the meantime, according to an exemplary embodiment of the present invention, when the control unit 10 of the sterilizer for the vehicle of embodiments of the present invention calculates detailed information on the estimated remaining time until the sterilization is completed illustrated in FIG. 5C, the control unit 10 calculates the estimated remaining time until the sterilization is completed by summing the time required for supplying supply water, the time required for generating HOCL, the time required for spraying the HOCL, and the drying time.

In this case, the drying time is calculated as minimum dry time ($T_{dry}$)+a in consideration of the additional time (a) required to reach the optimum temperature/humidity range to the minimum dry time ($T_{dry}$) calculated according to Equation 2.

For example, when the detailed information on the estimated remaining time until the sterilization is completed is calculated, when it is assumed that the time required for supplying supply water is 1 minute, the time required for generating HOCL after an interval of 10 seconds is 3 minutes 10 seconds, the time required for spraying the HOCL after the interval of 10 seconds is 2 minutes, a drying process is performed after the interval of 10 seconds, and the interval of 10 seconds is taken after the performance of the drying process, the estimated remaining time until the sterilization is completed is calculated as 6 minutes 50 seconds (1 minute+3 minutes 10 seconds+2 minutes+40 seconds (interval))+minimum dry time ($T_{dry}$)+α.

In this case, the control unit 10 may calculate the estimated remaining time until the sterilization is completed in consideration of operation times of the pumps 23 and 35 installed in the supply water storage unit 20 and the HOCL generating unit 30, and the HOCL generating unit and the spray unit 40.

Next, the control of the sterilizer for the vehicle of embodiments of the present invention including the foregoing configuration will be described.

Figure 6:
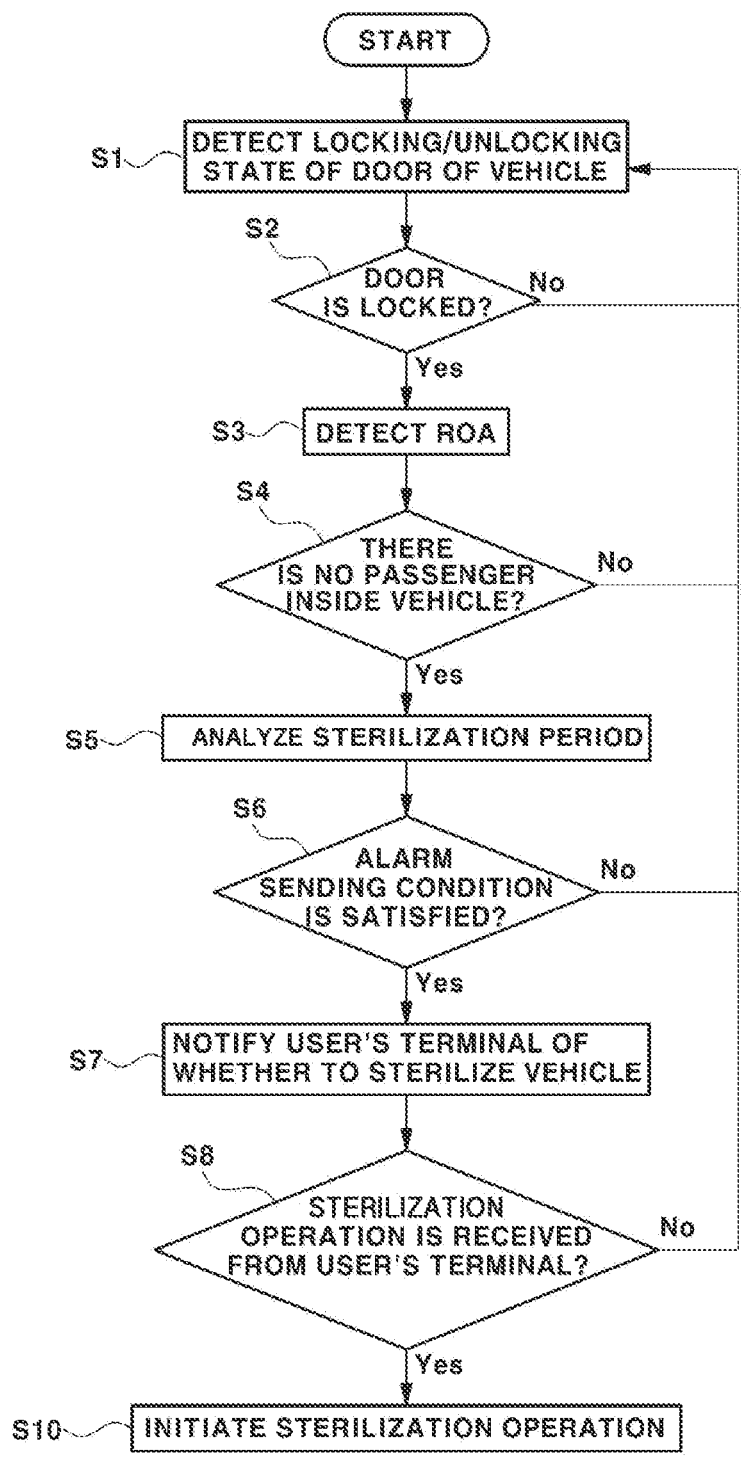
Figure 7:
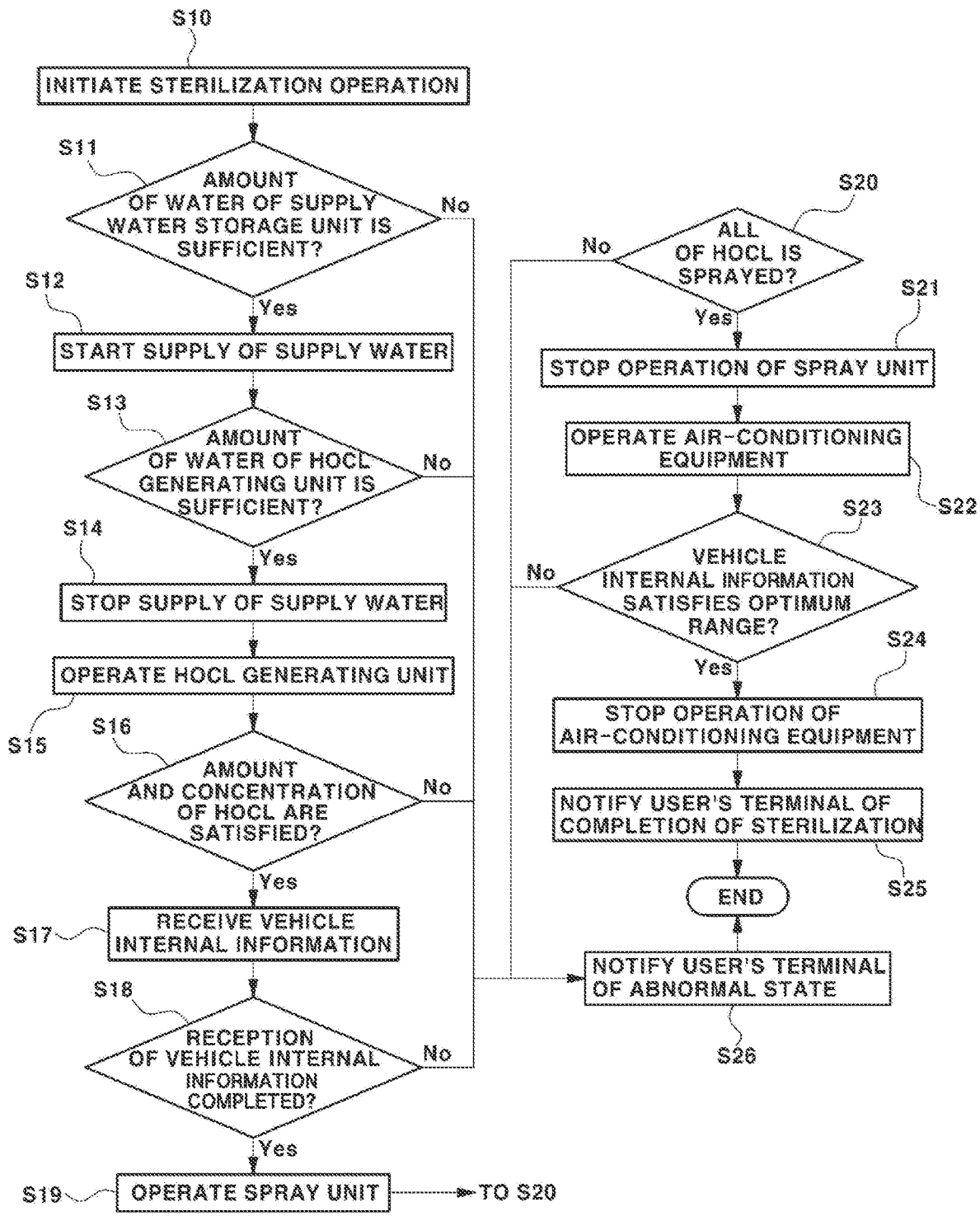

FIGS. 6 and 7 are flowcharts for controlling the sterilizer for the vehicle of embodiments of the present invention, in which FIG. 6 is a flowchart when the sterilizer is not operated and FIG. 7 is a flowchart when the sterilizer is operated.

The method of controlling the sterilizer 1 for the vehicle of embodiments of the present invention is the control method performed in the sterilizer 1 for the vehicle including the control unit 10, the supply water storage unit 20 for accommodating water required for generating HOCL under control of the control unit 10, the HOCL generating unit 30 for generating HOCL by using water accommodated in the supply water storage unit 20 under the control of the control unit 10, and the spray unit 40 for injecting the HOCL generated in the HOCL generating unit 30 to the inside or the outside of a vehicle under the control of the control unit 10.

First, referring to the flowchart of FIG. 6 illustrating the process when the sterilizer for the vehicle of embodiments of the present invention is not operated, according to an operation procedure of the sterilizer when the sterilizer for the vehicle of embodiments of the present invention is not operated, the control unit 10 of the sterilizer 1 for the vehicle of embodiments of the present invention receives a door locking/unlocking signal of the vehicle (S1), determines whether the door is locked according to the received door locking/unlocking signal (S2), and receives a detection signal of a Rear Occupant Alert (ROA) of the vehicle when the door is in the locked state (S3).

Then, the control unit 10 determines whether there is no passenger inside the vehicle according to the detection signal of the ROA of the vehicle in operation S3 (S4), and when there is no passenger inside the vehicle, the control unit 10 analyzes a sterilization period of the vehicle based on a recent operation record of the vehicle and an alarm sending record asking the user whether to sterilize the vehicle (S5).

Next, when the condition of sending the alarm asking the user whether to sterilize the vehicle is satisfied based on the sterilization period of the vehicle analyzed by the control unit 10 in operation S5 (S6), the control unit 10 sends the alarm asking whether to sterilize the vehicle to the portable terminal 100 of the user (S7).

Then, after operation S7, the control unit 10 determines whether command data to perform the sterilization of the vehicle is received from the portable terminal 100 of the user (S8), and when the command data to perform the sterilization is received, the control unit 10 progresses to a procedure of performing the sterilization of the vehicle, and the procedure of performing the sterilization of the vehicle will be described with reference to FIG. 7.

In operation S8, the control unit 10 determines whether the command data to perform the sterilization is received from the portable terminal 100 of the user and initiates the procedure of performing the sterilization of the vehicle when the command data to perform the sterilization is received (S10).

Subsequently, as shown in FIG. 7, the control unit 10 receives a sensor signal from the supply water measuring sensor installed in the supply water storage unit 20 and determines whether the amount of water in the supply water storage unit is sufficient (S11), and when it is determined that the amount of water in the supply water storage unit is sufficient, the control unit 10 starts the supply of water to the HOCL generating unit 30 (S12).

Next, the control unit 10 receives a sensor signal from the HOCL measuring sensor installed in the HOCL generating unit 30 and determines whether the amount of water in the HOCL generating unit is sufficient (S13), and when it is determined that the amount of water in the HOCL generating unit is sufficient, the control unit 10 stops the supply of water to the HOCL generating unit 30 from the supply water storage unit 20 (S14).

Then, the control unit 10 generates HOCL by operating the HOCL generating unit 30 (S15), and receives a sensor signal from the HOCL measuring sensor and determines whether the generated HOCL satisfies an effective chlorine concentration and a hydrogen ion concentration suitable for sterilization (S16).

Subsequently, when the generated HOCL satisfies the effective chlorine concentration and the hydrogen ion concentration suitable for sterilization in operation S16, the control unit 10 receives vehicle information provided by the vehicle information providing unit (S17).

As described above, the vehicle information providing unit 50 receives sensor signals generated from the vehicle sensor, such as the temperature sensor, the humidity sensor, the door-lock detecting sensor, and the passenger detecting sensor for sensing whether a passenger is seated on a front seat or a rear seat installed in the vehicle, generates vehicle information, such as an interior temperature of the vehicle, an outside temperature of the outside of the vehicle, inside humidity of the vehicle, outside humidity of the outside of the vehicle, a locking state of the door lock (a lock state or unlock state of the door), and whether a passenger is seated on the front seat or the rear seat of the vehicle, and transmits the generated vehicle information to the control unit 10.

Then, the control unit 10 determines whether the reception of the vehicle information is completed in operation S17 (S18), and when the reception of the vehicle information is completed, the control unit 10 sprays the generated HOCL to the vehicle by operating the spray unit 40 and sterilizes the inside or the outside of the vehicle (S19).

Subsequently, the control unit 10 determines whether all of the HOCL is sprayed by receiving the sensor signal from the HOCL measuring sensor (S20), and when all of the HOCL is sprayed, the control unit 10 stops the operation of the spray unit 40 (S21), and operates the air-conditioning equipment, such as an air-conditioner or a heater of the vehicle, for drying the HOCL (S22).

Next, the control unit 10 determines whether a measurement value of the vehicle internal information satisfies a predetermined optimum range by receiving the vehicle information provided by the vehicle information providing unit (S23). Herein, whether the measurement value of the vehicle internal information satisfies the predetermined optimum range may include whether the internal temperature of the vehicle satisfies an optimum range, whether the internal humidity of the vehicle satisfies an optimum range, and the like.

Subsequently, when the measurement value of the vehicle internal information provided by the vehicle information providing unit satisfies the predetermined optimum range, the control unit 10 stops the operation of the vehicle air-conditioning equipment (S24), and notifies the portable terminal 100 of the user of the completion of the sterilization operation of the vehicle (S25).

In the meantime, when the corresponding conditions are not satisfied in operations S11, S13, S16, S18, S20, and S23, the control unit 10 notifies the portable terminal 100 of the user that an abnormal state occurs during the sterilization operation of the vehicle (S26).

Accordingly, the sterilizer for the vehicle of embodiments of the present invention controlled as described above provides the sterilizer which is capable of providing HOCL to the vehicle itself, thereby keeping the sanitary state inside the vehicle clean.

As described above, the sterilizer for the vehicle of embodiments of the present invention and the control method thereof have been described in detail with reference to the drawings, but the present invention is not limited thereto and may also be specified in other aspects, and for example, the present invention may adopt other sterilization water, such as sodium hypochlorite aqueous solution or alcohol aqueous solution, not HOCL, and the system of the present invention may be applied for other purposes, such as humidity control in a vehicle or spraying of air freshener in a vehicle, other than vehicle sterilization.

What is claimed is:

1. A sterilizer comprising:
   a controller;
   a supply water storage configured to accommodate water for use in generating hypochlorous acid water (HOCL) under control of the controller;
   an HOCL generator configured to generate the HOCL by using water accommodated in the supply water storage under the control of the controller; and
   a sprayer configured to spray the HOCL generated in the HOCL generator under the control of the controller;
   wherein the controller is configured to:
      communicate with a portable terminal of a user through a communication network;
      receive, from the portable terminal, command data for manipulating the sterilizer according to execution of an application program for manipulating the sterilizer; and
      calculate an estimated remaining time until sterilization is completed by summing time required for supplying supply water, time required for generating HOCL, time required for spraying the HOCL and drying time,
   wherein the drying time is calculated by adding a minimum dry time ($T_{dry}$) calculated according to $T_{dry} = L_{HOCL} \times 0.01 \times T$ and an additional time ($\alpha$) required to reach an optimum temperature/humidity range, and wherein $L_{HOCL}$ is an amount of the HOCL to be sprayed in ml, and T is a minimum dry time per 100 ml.

2. The sterilizer of claim 1, wherein the water supply storage includes:
   a water tank configured to accommodate water; and
   a supply water measuring sensor configured to measure a state of the water accommodated in the water tank.

3. The sterilizer of claim 2, wherein the water supply storage further includes a filter configured to remove foreign substances or impurities included in the water accommodated in the water tank.

4. The sterilizer of claim 1, wherein the sprayer includes:
   a spray line configured to receive the HOCL from the HOCL generator; and
   one or more spray nozzles installed in the spray line and configured to spray the HOCL.

5. The sterilizer of claim 1, further comprising:
   a water supply source configured to supply water to the supply water storage.

6. The sterilizer of claim 5, wherein the water supply source is a water trap comprising a storage place configured to temporarily store water that is a by-product generated in a stack of a fuel cell.

7. The sterilizer of claim 5, wherein the water supply source is a drain hose configured to discharge water generated during a cooling operation of a vehicle air-conditioning equipment.

8. The sterilizer of claim 5, wherein the water supply source is a water inlet comprising a container installed in a vehicle and configured to directly receive water from the user.

9. The sterilizer of claim 1, further comprising:
   a discharge port configured to discharge water to an outside of a vehicle based on a state of the water supplied to the supply water storage.

10. The sterilizer of claim 1, wherein the controller is linked with a vehicle information provider and a vehicle air-conditioning equipment, and is configured to control spraying the HOCL according to vehicle internal state information provided from the vehicle information provider and then to control drying of an interior of the vehicle by the vehicle air-conditioning equipment.

11. The sterilizer of claim 10, wherein the vehicle information provider includes at least one of a temperature sensor, a humidity sensor, a door-lock detecting sensor, or a passenger detecting sensor.

12. A sterilizer for a vehicle, the sterilizer comprising:
   a controller;
   a supply water storage configured to accommodate water required for generating hypochlorous acid water (HOCL) under control of the controller;
   an HOCL generator configured to generate the HOCL by using the water accommodated in the supply water storage under the control of the controller, wherein the HOCL generator includes:
      a decomposing tank configured to accommodate the water supplied from the supply water storage and electrolyze the accommodated water to generate the HOCL; and
      an HOCL measuring sensor configured to measure a state of the water accommodated in the decomposing tank and a state of the generated HOCL; and
   a sprayer configured to inject the HOCL generated in the HOCL generator to the vehicle under the control of the controller;
   wherein the controller is configured to:
      communicate with a portable terminal of a user through a communication network;
      receive, from the portable terminal, command data for manipulating the sterilizer according to execution of an application program for manipulating the sterilizer; and
      calculate an estimated remaining time until sterilization is completed by summing time required for supplying supply water, time required for generating the HOCL, time required for spraying the HOCL and drying time, wherein the drying time is calculated by adding a minimum dry time ($T_{dry}$) calculated according to $T_{dry}=L_{HOCL}\times 0.01\times T$ and an additional time ($\alpha$) required to reach an optimum temperature/humidity range, and wherein $L_{HOCL}$ is an amount of the HOCL to be sprayed in ml, and T is a minimum dry time per 100 ml.

13. The sterilizer of claim 12, wherein the HOCL generator further includes an injector configured to accommodate a reactant solution for use in electrolysis to produce a sterilant by changing the water accommodated in the decomposing tank to water having an effective chlorine concentration and a hydrogen ion concentration suitable for sterilization, and to inject the sterilant.

14. The sterilizer of claim 13, wherein the injector includes a measuring sensor configured to measure a state of the sterilant accommodated in the injector.

15. The sterilizer of claim 12, wherein the HOCL measuring sensor is a water level measuring sensor configured to measure a level of the HOCL.

16. A sterilizer for a vehicle, the sterilizer comprising:
vehicle air-conditioning equipment;
a plurality of sensors including a temperature sensor, a humidity sensor, a door-lock detecting sensor, and a passenger detecting sensor;
a controller is linked with the plurality of sensors and the vehicle air-conditioning equipment;
a supply water storage configured to accommodate water for use in generating hypochlorous acid water (HOCL) under control of the controller;
an HOCL generator configured to generate the HOCL by using water accommodated in the supply water storage under the control of the controller; and
a sprayer configured to inject the HOCL generated in the HOCL generator to the vehicle under the control of the controller;
wherein the controller is configured to control spraying the HOCL according to vehicle internal state information provided from a vehicle information provider and then to control drying of an interior of the vehicle by the vehicle air-conditioning equipment
wherein the controller is further configured to:
communicate with a portable terminal of a user through a communication network;
receive, from the portable terminal, command data for manipulating the sterilizer according to execution of an application program for manipulating the sterilizer; and
calculate an estimated remaining time until sterilization is completed by summing time required for supplying supply water, time required for generating the HOCL, time required for spraying the HOCL and drying time,
wherein the drying time is calculated by adding a minimum dry time ($T_{dry}$) calculated according to $T_{dry}=L_{HOCL}\times 0.01\times T$ and an additional time ($\alpha$) required to reach an optimum temperature/humidity range, and wherein $L_{HOCL}$ is an amount of the HOCL to be sprayed in ml, and T is a minimum dry time per 100 ml.

17. The sterilizer of claim 16, wherein the water supply storage includes:
a water tank configured to accommodate water; and
a supply water measuring sensor configured to measure a state of the water accommodated in the water tank.

18. The sterilizer of claim 17, wherein the water supply storage further includes a filter configured to remove foreign substances or impurities included in the water accommodated in the water tank.

19. The sterilizer of claim 16, wherein the sprayer includes:
a spray line configured to receive the HOCL from the HOCL generator; and
one or more spray nozzles installed in the spray line and configured to spray the HOCL to the vehicle.

20. The sterilizer of claim 16, further comprising a water supply source configured to supply water to the supply water storage.

* * * * *

UNITED STATES PATENT AND TRADEMARK OFFICE
CERTIFICATE OF CORRECTION

| | | |
|---|---|---|
| PATENT NO. | : 12,496,367 B2 | Page 1 of 1 |
| APPLICATION NO. | : 17/363592 | |
| DATED | : December 16, 2025 | |
| INVENTOR(S) | : Baeg et al. | |

It is certified that error appears in the above-identified patent and that said Letters Patent is hereby corrected as shown below:

On the Title Page

Item (73), in Column 1, in "Assignees", Line 1, delete "South" and insert -- Seoul --.

Item (73), in Column 1, in "Assignees", Line 2, delete "South" and insert -- Seoul --.

In the Claims

In Column 11, in Claim 1, Line 55, delete "HOCL, time" and insert -- the HOCL, time --.

Signed and Sealed this
Tenth Day of February, 2026

John A. Squires
*Director of the United States Patent and Trademark Office*